(12) United States Patent
Muramatsu et al.

(10) Patent No.: US 7,083,210 B2
(45) Date of Patent: Aug. 1, 2006

(54) ELECTRIC TWEEZERS

(75) Inventors: Naoki Muramatsu, Tokyo (JP);
Tomoyoshi Tada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 124 days.

(21) Appl. No.: 10/499,124

(22) PCT Filed: Jan. 15, 2003

(86) PCT No.: PCT/JP03/00265

§ 371 (c)(1),
(2), (4) Date: Jun. 17, 2004

(87) PCT Pub. No.: WO2004/062855

PCT Pub. Date: Jul. 29, 2004

(65) Prior Publication Data

US 2005/0264019 A1    Dec. 1, 2005

(51) Int. Cl.
*B25J 15/12*    (2006.01)

(52) U.S. Cl. .................... 294/100; 294/99.1; 294/86.4; 901/36

(58) Field of Classification Search ................. 294/1.1, 294/86.4, 99.1, 100; 901/30, 31, 36, 40, 901/45; 977/DIG. 1
See application file for complete search history.

(56) References Cited

U.S. PATENT DOCUMENTS

| | | | | |
|---|---|---|---|---|
| 5,458,387 A | * | 10/1995 | Conway et al. | 294/100 |
| 5,895,084 A | * | 4/1999 | Mauro | 294/100 |
| 6,513,213 B1 | * | 2/2003 | Muramatsu et al. | 29/25.35 |
| 6,691,586 B1 | * | 2/2004 | Muramatsu | 74/25 |
| 6,935,666 B1 | * | 8/2005 | Muramatsu et al. | 294/99.1 |

FOREIGN PATENT DOCUMENTS

| | | |
|---|---|---|
| JP | 2001-293264 A | 10/2001 |
| WO | WO 99-30877 A1 | 6/1999 |
| WO | WO 02-081364 A1 | 10/2002 |

* cited by examiner

*Primary Examiner*—Dean J. Kramer
(74) *Attorney, Agent, or Firm*—Sughrue Mion, PLLC

(57) ABSTRACT

Electric tweezers 1 includes a gripping member 13 for releasing/gripping an object, a base member 11 having an engagement portion to be engaged with the one end portion of the gripping member, a holder member 62 for fixedly coupling one end portion of the gripping member 13 and having a penetrating hollow cylindrical portion, a switch 57 for rotating and stopping a motor, a transformation mechanism 30 coupled with a shaft 52*a* of the motor 52 for transforming a rotation of the motor 52 in one direction into a quantity of translational displacement in a predetermined reciprocating direction with respect to the other end portion 13*g* of the gripping member, and an attaching section for attaching the base member 11 to a plurality of different positions relative to the holder member 62.

7 Claims, 10 Drawing Sheets

FIG. 11 (a)
FIG. 11 (b)
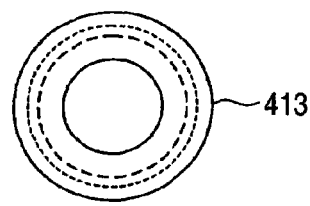
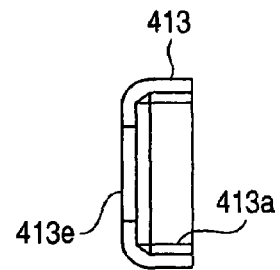
FIG. 12
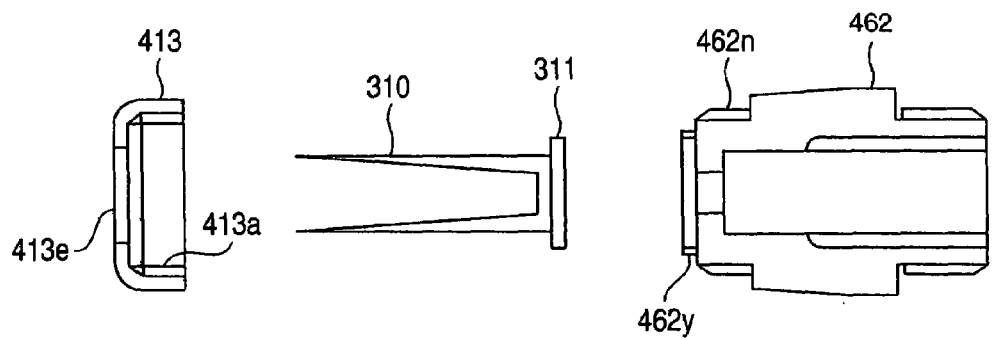

ELECTRIC TWEEZERS

TECHNICAL FIELD

The present invention relates to improvements in tweezers for holding a very small part. More particularly, the present invention relates to simple electric tweezers having a displacement enlarging mechanism.

BACKGROUND ART

One of the present inventors proposed a gripper having a very simple mechanism in the official gazette of International Patent Publication No. WO99/30877. This gripper is characterized in that a small quantity of translational movement is transformed into a quantity of bending displacement being enlarged tenfold or more at a tip of each finger of the gripper by applying a buckling phenomenon of a long column to the finger without using a specific displacement enlarging mechanism.

With this gripper, it becomes possible to softly hold a very small part. Further, since the size of this gripper is small and the weight is light, this gripper is suitably used for a robot hand.

However, the present inventor made investigations in earnest and found the following. In a case where the gripper is applied to the use for holding an object by conducting a predetermined opening and closing motion, a quantity of opening and closing a gripping member for holding the object must be set at an appropriate value. Therefore, it is necessary to adjust the rotary angles of a motor in the forward and backward rotating directions so that a quantity of translational displacement of reciprocation at the other end of the gripping member becomes a predetermined value. This operation is complicated. In view of this, the inventor filed an international application of electric tweezers (International Application No. PCT/JP/11839).

DISCLOSURE OF THE INVENTION

This invention is a further improvement of the above international application, and its object is to provide electric tweezers including a gripping member having a function of enlarging a translational displacement, and being capable of making a prescribed opening/closing of the gripping member in a simple structure, which can easily adjust the opening/closing direction of the gripping member in order to facilitate easy gripping of an object.

Electric tweezers according to the invention is characterized by including: a motor; a gripping member for releasing and gripping an object, the gripping member having one end portion and the other end portion that enlarges a quantity of opening and closing of a tip portion according to a quantity of translational displacement of reciprocation; a base member having an engagement portion to be engaged with the one end portion of the gripping member; a holder member for fixedly coupling the one end portion, the holder member having a penetrating hollow cylindrical portion; a switch means for rotating and stopping the motor; a transformation mechanism accommodated in the holder member and coupled with a shaft of the motor, the transformation mechanism transforming a rotation of the motor in one direction into a quantity of translational displacement in a predetermined reciprocating direction with respect to the other end portion of the gripping member; and an attaching means capable of detachably attaching the base member to a plurality of different positions relative to the holder member.

According to such electric tweezers, the transformation mechanism serves to transform the rotation of the motor into a predetermined reciprocating translational displacement for the other end portion of the gripping member, and the switch means serves to rotate/stop the motor. Therefore, the translation displacement of the other end portion of the gripping member becomes a prescribed quantity so that the opening/closing quantity of the gripping member becomes constant. Thus, the electric tweezers can be easily provided which can close (grip) and open a predetermined object.

In addition, the attaching means can detachably attach the base member at a plurality of different positions relative to the holder member. The opening/closing direction at the tip portion of the gripping member can be selected stepwise according to the object.

The electric tweezers according to another invention are characterized in that the attaching means having a plurality of concave/convex portions provided in the holder member and convex or concave portions provided in the base member.

According to such electric tweezers, the attaching means can be provided in a simple structure.

The electric tweezers according to still another invention are characterized in that the base member has an outer edge that is substantially circular and slits that are compressed when the outer edge is pressed, and serves as the attaching means; and the holder member has a cylindrical portion to be fixedly engaged with the base member, and serves as the attaching means.

According to such electric tweezers, the opening/closing direction of the gripping member can be continuously selected according to the object in a simple structure.

The electric tweezers according to a further invention are characterized in that the attaching means couples the holder member and the base member through a magnetic member made of a permanent magnet.

According to such electric tweezers, in a simple structure, the opening/closing direction of the gripping member can be easily continuously selected according to the object.

The electric tweezers according to a still further invention are characterized in that the attaching means includes a screw formed on an outer periphery of the holder member and a fixing member screwed to the screw to fix the base member.

According to such electric tweezers, it is effective that in a simple structure, the opening/closing direction of the gripping member can be continuously selected according to the object.

BRIEF DESCRIPTION OF THE DRAWINGS

FIG. 11 is a plan view (a) and front sectional view (b) of a holding nut according to a further embodiment of this invention; and FIG. 12 is an exploded perspective view of the holding nut shown in FIG. 11, a base member and a holder member inclusive of their partial sections.

BEST MODE FOR CARRYING OUT THE INVENTION

FIRST EMBODIMENT

Figure 1:
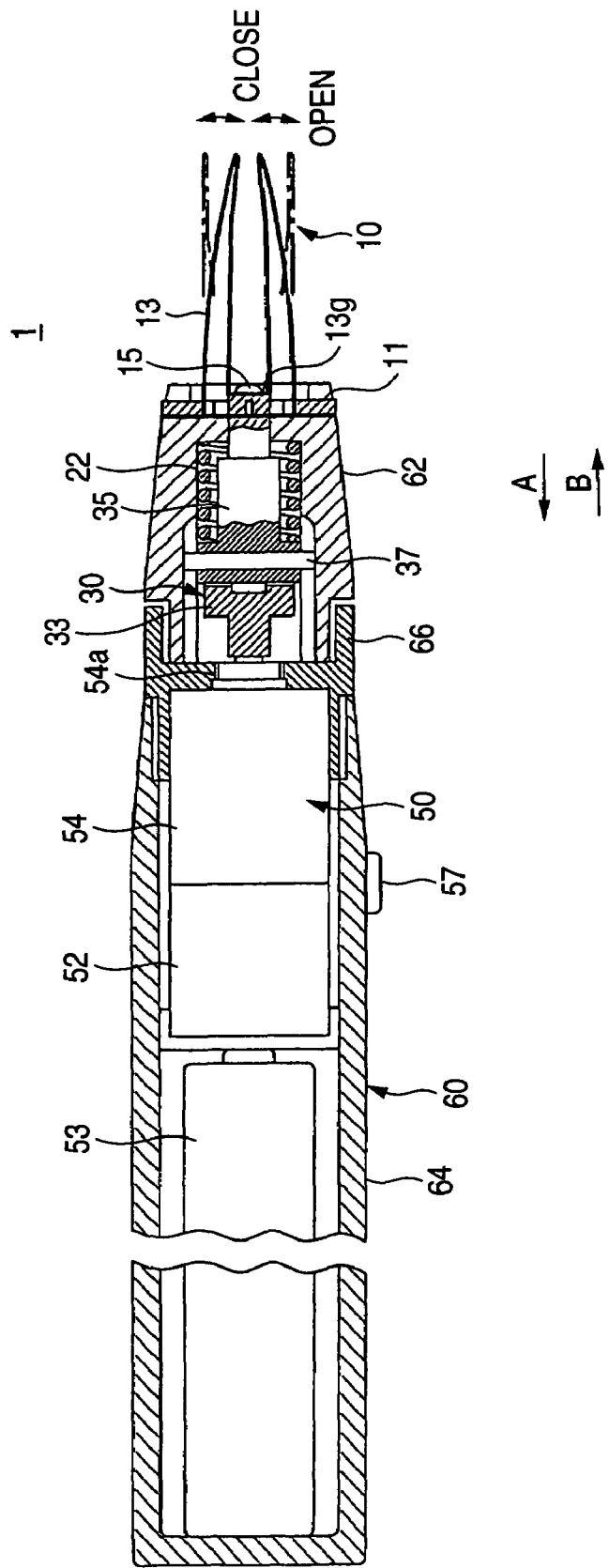
FIG. 1 is an entire cross-sectional view of electric tweezers according to an embodiment of this invention.
Figure 2:
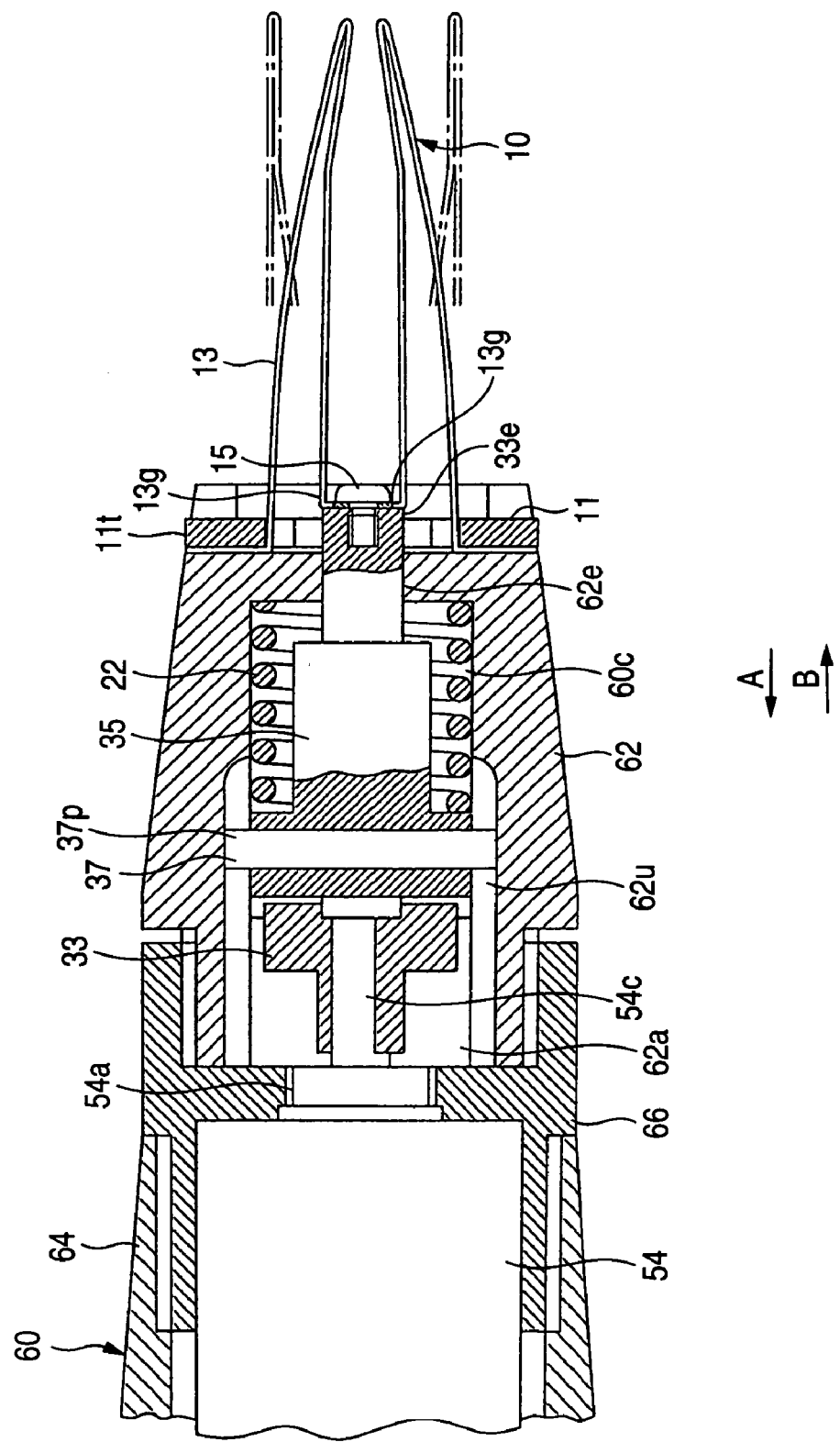
FIG. 2 is a partial enlarged view of the electric tweezers shown in FIG. 1.
Figure 3:
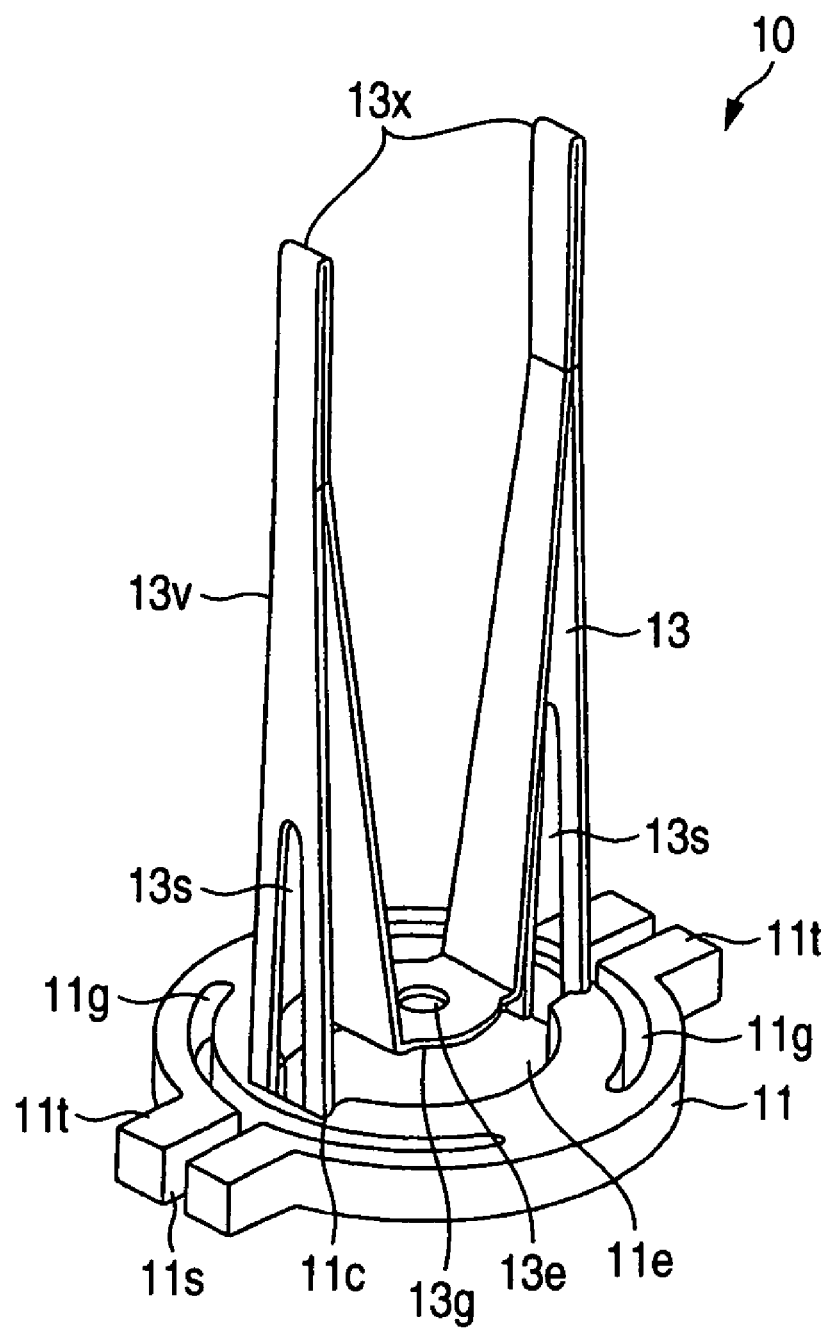
FIG. 3 is a perspective view of a finger unit used for the electric tweezers shown in FIG. 1.
Figure 4:
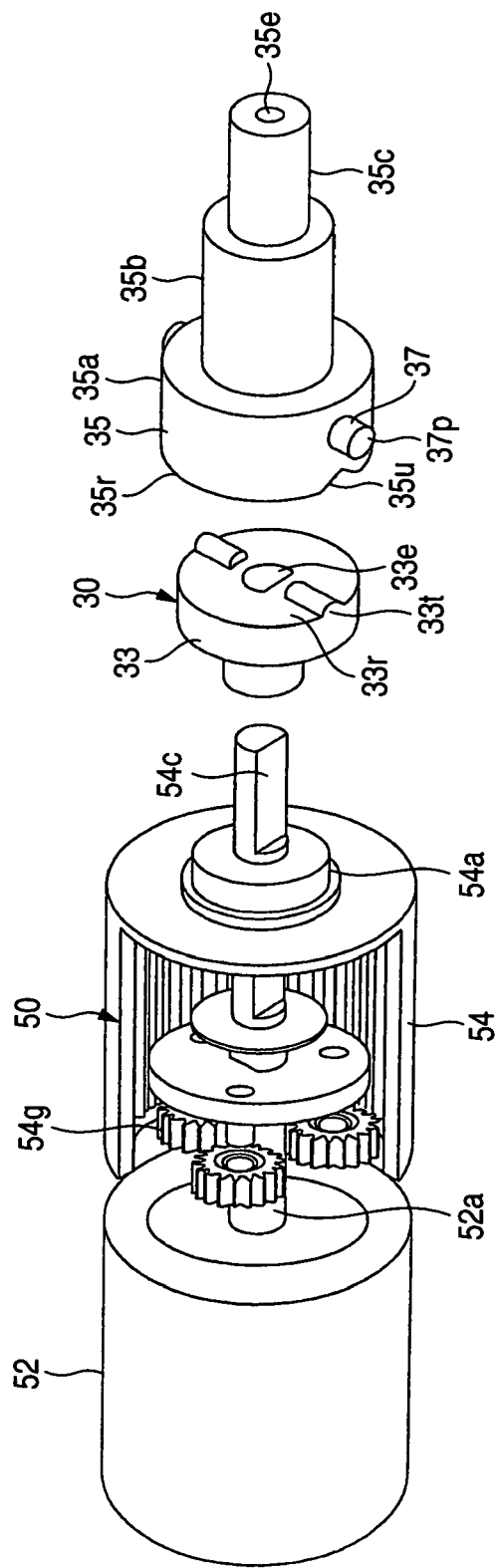
FIG. 4 is an exploded perspective view of a cam, a cam follower, a deceleration mechanism, a motor of the electric tweezers shown in FIG. 1.
Figure 5:
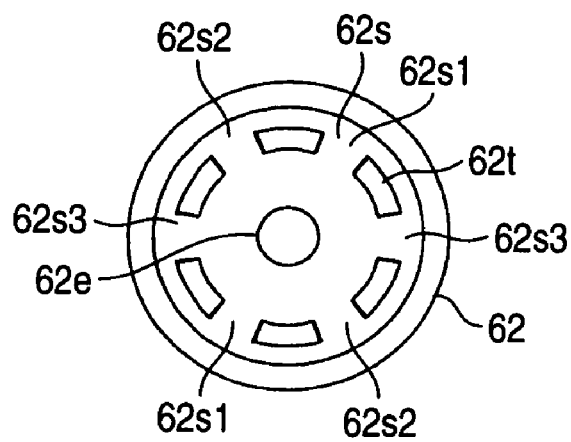
FIG. 5 is a plan view (a) and a front sectional view (b) of a holder member shown in FIG. 1.
Figure 5:
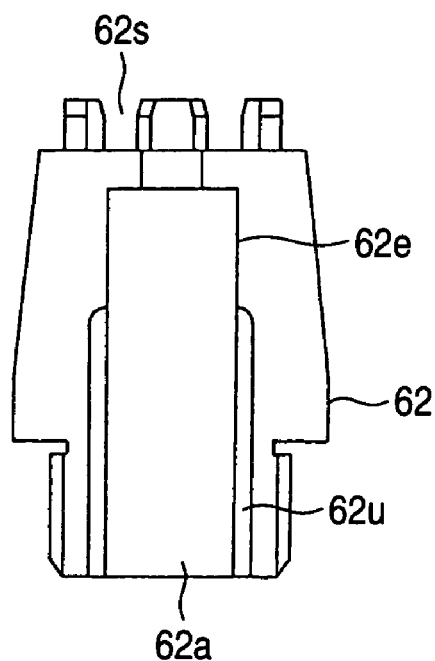

Now referring to FIGS. 1 to 5, an explanation will be given of an electric tweezers according to an embodiment of this invention. FIG. 1 is an entire cross-sectional view of electric tweezers according to an embodiment of this invention. FIG. 2 is a partial enlarged view of a main part of the electric tweezers shown in FIG. 1. FIG. 3 is a perspective view of a finger unit. FIG. 4 is an exploded perspective view of a transformation mechanism and a motor of the electric tweezers. FIG. 5 is a plan view (a) and a front sectional view (b) of a holder member.

In FIGS. 1 to 5, the electric tweezers 1 includes a gripping finger 13 which serve as a gripping member having one end portion and the other end portion, a finger unit 10, a driving section 50 having a motor 52 connected to a common portion (the other end portion) 13g for translationally displacing the common portion 13g, a transformation mechanism 30 which serves to transform the rotation in a prescribed direction which is one direction of the axis 52a of the motor 52, i.e. the rotation which is one of a normal rotation and a reverse rotation, into a prescribed reciprocating translational displacement of the common portion 13g of the gripping finger 13, the quantities of translational displacement in a going path and returning path being equal, a screw 15 which serves to secure a common portion 13g of the gripping finger 13 to the end of the transformation mechanism 30, and a case section 60 which accommodates the driving section 50 and the transformation mechanism 30 and fixes the finger unit 10.

As seen from FIG. 3, the finger unit 10 includes the gripping finger 13 which serves as the gripping member and a base member 11. The gripping finger 13 has the common portion 13g, which is the other end portion, having a hole 13e made at the center, and two V-shape pieces 13v each of which is in the form of a substantially V-shape and has a slit 13s centered on the outer side. The V-shape pieces are designed to open/close so that their tips 13x expansively displace when the common portion 13g is pulled or returned on the basis of the translational displacement. The V-shape pieces 13v serves to close (grip) or release an object to be gripped.

The base member 11 is formed in a flat-washer shape and has a hole 11e made at the center. The base member 11 has two protrusive pieces 11t on the outer periphery. The base member 11 has two recesses 11c which are to be engaged with the gripping finger 13 while the ends of the V-shape pieces 13v, i.e., the one end portions of the gripping finger 13 are nipped. The protrusive pieces 11t serving as protrusions have slits 11s. The protrusive pieces 11t are so designed that when the sides of the protrusive pieces 11t are pressed by sandwiching using arc-shaped slits 11g communicating with the slits 11s, they are compressed to be inserted into grooves 62s of a holder member 62, and when the sandwiching is released, the protrusive pieces 11t are restored by a spring force so that they are engaged with the grooves 62s. In short, the protrusive pieces 11t are formed so that they are elastically deformed inwardly to narrow their width when their sides are pressed inwardly.

The case section 60 includes a holder member 62 accommodating the transformation mechanism 30 and holding the base member 11 of the finger unit 10, a case 64 accommodating a motor 52 and a battery 53, and a motor receiver 66 fixing the end of the motor 52 and the end of the holder member 62.

The holder member 62 has a hollow cylindrical portion 62a. The holder member 62 has a hole 62e made at the center, into which a tip pole 35c of a cam follower 35 is to be inserted. In the hollow cylindrical portion 62a, two semi-circular grooves 62u along which a guiding protrusion 37 of the cam follower 35 is slid are formed, these grooves being longer than the translational displacement in a translation displacement direction. In the holder member 62, the transformation mechanism 30 and a coil-shaped compressive spring 22 are accommodated.

It should be noted that the reason why the guiding protrusion 37p of the cam follower 35 moves slidably along the grooves 62u of the holder member 62 is to prevent the cam follower 35 from rotating owing to the rotation of the cam 33.

Figure 6:
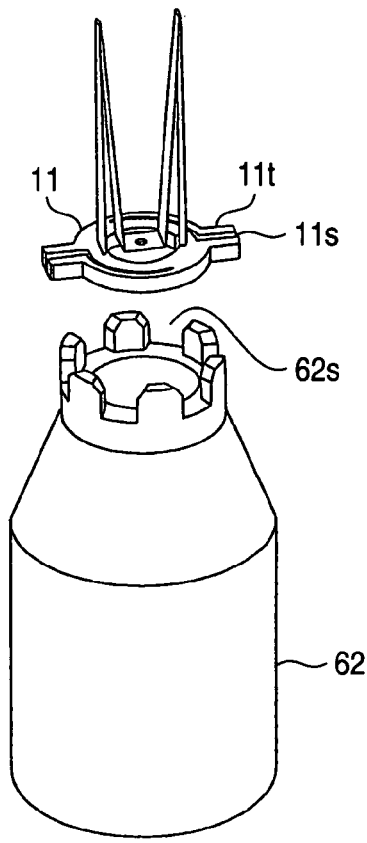
FIG. 6 is an exploded perspective view (a) of detachment/attachment between a base member and the holder member shown in FIG. 1 and a perspective view (b) of integration of the base member and holder member.
Figure 6:
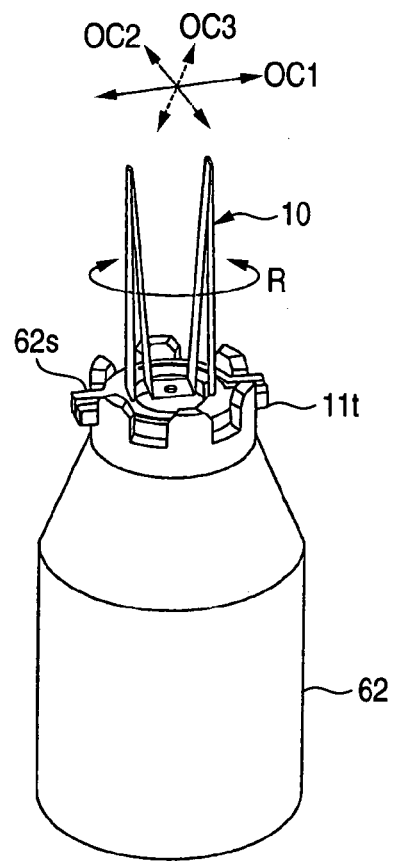

In FIGS. 5 and 6, in the cylindrical portion at the tip of the holder member 62, there are six protrusions 62t provided upright at regular intervals of 60° on the outer periphery and three pairs of slits 62s located at regular intervals of 60° between adjacent protrusions 62t, i.e., plural different positions, each pair of slits being 62s1, 62s1, 62s2, 62s2 and 62s3, 62s3. The slits 62s and protrusions 62t constitute uneven portions which serves as an attaching means with which the protrusive pieces 11t of the base member 11 are securely engaged. The width of each slit is made slightly narrower than that of the protrusive piece 11t of the base member 11. Therefore, when the protrusive pieces 11t of the base member 11 is engaged with any pair of slits 62a1, 62s2 and 62s3, the protrusive pieces 11t are attached to any pair of slits 62s1, 62s2 and 62s3. This intends to select the position where the finger unit 10 is fixed to the tip of the holder unit 62 in three steps of open/close directions OC1 to OC3 of the gripping member 13 by selection from another step.

Incidentally, the holder member 62 has a function of attaching/detaching means for attaching/detaching the protrusive pieces 11t of the base member 11 to/from the slits 62s of the holder member 62.

The transformation mechanism 30 includes a substantially circular plate cam 33 which is coupled with a shaft 54c of the motor 52 and has a lifting portion of a first convex portion 33t formed on a contour 33r, and a cam follower 35 which is operated by the movement of the lifting portion of the cam 33 and has a second concave portion 35u formed on a contour 35r, which corresponds to, i.e., is contact-engaged with the convex portion 33t.

The cam 33 has a hole 33e with which the shaft 54c of a deceleration mechanism 54 is engaged, and the convex portion 33t has an inclination, the section of which is semi-circular.

The cam follower 35 includes three circular cylinders, i.e., a base cylinder 35a, intermediate cylinder 35b and tip cylinder 35c which are thicker in this order. On the side of the base cylinder 35a, two guiding protrusions 37p are formed by stabbing a straight pin. In the tip cylinder 35c, a screw hole 35e for fixing the common portion 13g of the gripping finger 13 is made. The concave portion 35u of the cam follower 35 has an inclination, the section of which is elliptical so as to be engaged with the inclination of the convex portion 33t of the cam 33 while defining a slight gap therebetween.

The driving section 50 includes a battery 53 for generating a D.C. voltage which serves as a driving source of the motor 52 and a decelerating mechanism 54 having a gear wheel 54g for decelerating the rotation of the shaft 52a of the motor 52 at a prescribed deceleration ratio. The deceleration mechanism 54 includes a screw portion 54a for attachment and a shaft 54c. The reason why the decelerating mechanism 54 is provided is that the rotary speed of the motor 52 is decelerated to a suitable value so as to adjust the moving speed of the translational displacement in the common portion 13g of the gripping finger 13, thereby making appropriate the opening/closing speed of the gripping finger 13.

The reason why the decelerating mechanism 54 includes the gear wheel 54g is that even when the power source of the motor 52 is interrupted by a switch 57 with the object gripped by the gripping finger 13, the rotation of the motor 52 is kept in a stopping state, thereby preventing the gripping finger 13 from shifting from the closing state to the opening state.

Incidentally, the deceleration mechanism 54 may be e.g. a known planetary gear mechanism.

The switch 57 which serves as a switch means is secured to the case section 60 and serves to connect/disconnect the battery 53 of the D.C. power source to/from the motor 52, thereby rotating and stopping the motor 52 so that with the polarity of the battery 53 being unchanged, the motor 52 is rotated or stopped in a predetermined direction.

The compressive spring 22 which serves as an elastic member is adapted so that by pushing the base cylinder 35a of the cam follower 35 in a direction of arrow A, the contour 33r of the cam 33 and the contour 35r of the cam follower 35 are brought into contact with each other. This intends to transmit surely the operation of the cam 33 based on the rotation of the motor 52 to the cam follower 35. In this way, in a state where the switch 57 is off, i.e., the motor 52 is stopping, the compressive spring 22 presses the cam follower 35 in a direction of arrow A so that when the convex portion 33t of the cam 33 is engaged with the concave portion 35u of the cam follower 35, the common portion 13g of the gripping finger 13 is pulled in the direction of arrow A, thereby causing the gripping finger 13 to be closed to grip the object.

Namely, the gripping force of the gripping finger 13 depends on the spring force of the compressive spring 22, and the force of opening the gripping finger 13 depends on the torque of the motor 52.

Referring to FIGS. 1 and 2, an explanation will be given of the operation of the electric tweezers constructed as described above. Now, with the gripping finger 13 being opened, when an operator depresses the switch 57, the voltage from the battery 53 is applied to the motor 52 so that the motor 52 starts to rotate. By the shaft 52a of the motor 52, the shaft 54c of the deceleration mechanism 54 is rotated and simultaneously the cam 33 is rotated at the same speed in the same direction.

When the concave portion 35u of the cam follower 35 urged in the direction of arrow A by the compressive spring 22 and the convex portion 33t of the cam 33 are slid to be engaged with each other, the common portion 13g of the gripping finger 13 is pulled in the direction of arrow A to move while it is translationally displaced. As a result, the opposite V-shape pieces of the gripping finger 13 are closed to grip the object.

Now, when the operator moves his hand off the switch 57, the current flowing in the motor 52 is interrupted so that the rotation of the motor 52 stops. Then, the gripping finger 13 tend to open owing to the spring force of the V-shape pieces 13V of the gripping finger 13. In this case, the rotation of the shaft 52a of the motor 52 is inhibited owing to the friction force of the wheel gear 54g of the deceleration mechanism 54. Therefore, the V-shape pieces 13V of the gripping finger 13 remains closed to maintain the gripping of the object.

Next, when the operator depresses the switch 57, as described above, the shaft 52a of the motor 52 is rotated, and simultaneously the cam 33 is rotated at the same speed in the same direction. When the convex portion 33t of the cam 33 and the concave portion 35u of the cam follower 35 are slid to be disengaged from each other, the common portion 13g of the gripping finger 13 is returned in the direction of arrow B to move while it is translationally displaced. As a result, the opposite V-shape pieces of the gripping finger 13 are opened to release the object.

Further, referring to mainly FIGS. 2, 5 and 6, an explanation will be given of the operation of attachment/detachment of the finger unit 10 for the holder member 62. First, when attaching the finger unit 10 to the holder member 62, as shown in FIG. 2, FIG. 6(a) and FIG. 6(b), after the opening/closing direction at the tip portion of the gripping finger 13 has been set at one of the directions OC1 to OC3 in relation to the switch 57, for example, the protrusive pieces 11t of the finger unit 10 are attached to any one of the pairs of slits 62a1, 62s2 and 62s3 of the holder member 62 which is suitable to the above opening/closing direction. After the base member 11 of the finger unit 10 has been attached to the holder member 62, the common portion 13g of the gripping finger 13 is fixed to the hole 35e of the cam follower 35 using the screw 15. In this way, the finger unit 10 is secured to the holder member 62 so that one end portions of the gripping finger 13 are secured to or coupled with the case section 60.

On the other hand, when detaching the finger unit 10 from the holder member 62, by turning the screw 15 as shown in FIG. 2, FIG. 6(a) and FIG. 6(b), the common portion 13g of the gripping finger 13 is separated from the cam follower 35. Thereafter, the protrusive pieces 11t of the finger unit 10 are removed from the slits 62s of the holder member 62.

In this embodiment, the position where the protrusive pieces 11t of the finger unit 10 are secured to the holder member 62 can be set to any one of the pairs of slits 62s1 to 62s3 selected from a number of slits 62s. For this reason, the position where the finger unit 10 is secured to the holder member 62 in relation to the switch 57 can be set at any of three steps (plural steps) selected by the direction R of turning the finger unit 10 so that the opening/closing direction of the gripping finger 13 is selected to any of the plurality of directions OC1 to OC3. Therefore, when the operator grips or releases the object using the electric tweezers 1 held by his hand through the opening/closing operation of the gripping finger 13 while operating the switch 57, the workability can be improved.

Further, where the electric tweezers 1 is fixed to e.g. a robot hand, the opening/closing direction of the gripping finger 13 can be easily selected in a manner described above.

Incidentally, in the embodiment described above, the base member 11 is provided with the protrusive pieces 11t as convex portions whereas the holder member 62 is provided with the convex/concave portions, and the protrusive pieces 11t are securely engaged with the convex/concave portions. However, the base member 11 may be provided with concave portions (inclusive of holes) which are securely engaged with the above concave/convex portions.

Further, since the gripping finger 13 is opened/closed by the unidirectional rotation of the motor 52, the operator is free from the finger force for opening/closing the tweezers to grip the object such as a component.

Further, the unidirectional rotation of the motor 52 is transformed into the translational displacement in a prescribed reciprocating direction by the transformation mechanism 30 so that the opening/closing quantity of the gripping finger 13 can be made constant. Particularly, the electric tweezers 1 is suitable to the uses of gripping/releasing the objects having the same shape. In addition, the switch 57 does not have a function of changing the polarity of the battery 53 in order to make normal/reverse rotation of the motor so that the wiring can be made easily.

Additionally, the transformation mechanism 30 in the first embodiment includes the cam 33 coupled with a shaft 52a of the motor 52 and having the lifting portion of the first convex portion 33t (or first concave portion); and the cam follower 35 which is coupled with the other end portion 13g to transform the unidirectional rotation of the cam 33 into the translational displacement in the predetermined direction for the other end portion 13g and has the second concave portion 33u (or second convex portion) corresponding to the lifting portion. Such tweezers 1 can provide the transformation mechanism 30 having a simple structure for the unidirectional rotation of the motor 52 to be transformed into the translational displacement in the predetermined direction for the other end portion 13g of the gripping finger 13.

Further, in accordance with the first embodiment, the elastic member (compressive spring) 22 can be provided which is housed in the case section 60 coupled with the holder member 62 and serves to bring the lifting portion and the second concave portion 33u (or second convex portion) into contact with each other by pushing the cam 33 or cam follower 35.

In accordance with such tweezers, by bringing the cam 33 and the cam follower 35 into contact with each other using the elastic member, the operation of the cam 33 by the rotation of the motor 52 can be securely transmitted to the cam follower 35 so that the opening/closing operation of the electric tweezers 1 can be surely made.

SECOND EMBODIMENT

Figure 7:
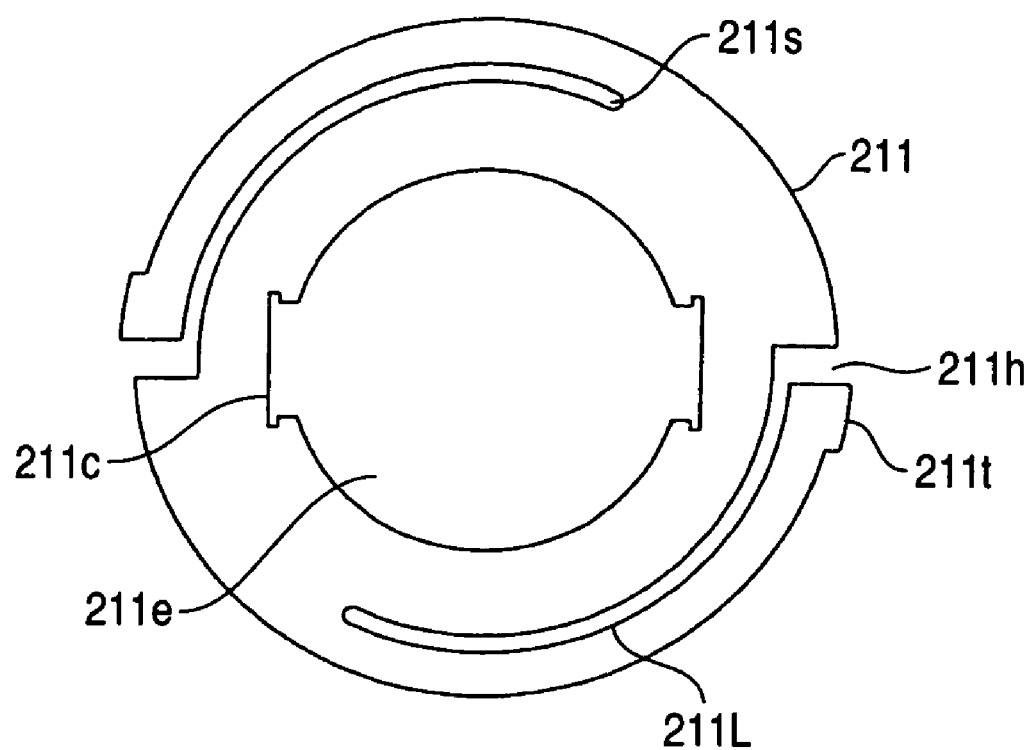
FIG. 7 is a plan view of a base member according to another embodiment of this invention.
Figure 8:
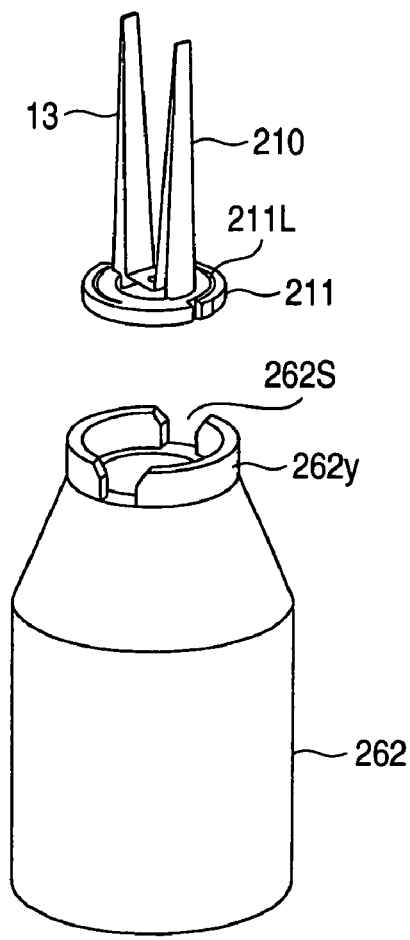
FIG. 8 is an exploded perspective view (a) of detachment/attachment between the base member shown in FIG. 7 and a holder member and a perspective view (b) of integration of the base member and holder member.
Figure 8:
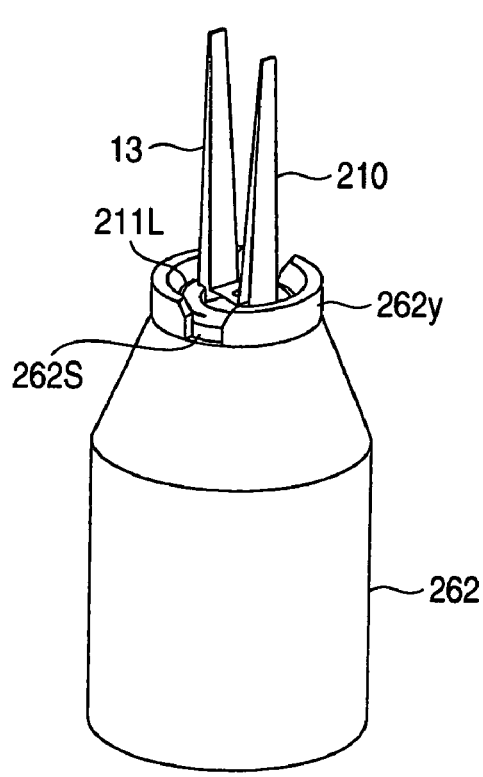

Referring to FIGS. 7 and 8, an explanation will be given of another embodiment of this invention. FIG. 7 is a plan view of a base member. FIG. 8 is a perspective view for explaining the attachment/detachment between the base member and a holder member.

In the first embodiment, the opening/closing direction of the gripping finger 13 could be selected. In this embodiment, the selection can be made continuously.

In FIGS. 7 and 8, a base member 211 is formed in a flat washer shape. The base member 211 has a substantially circular outer periphery (outer edge) and a hole 211e formed at the center. Like the first embodiment, the base member 211 has two recesses 211c which are to be engaged with the gripping finger 13 while the one end portion thereof is nipped.

Each of slits 211s of the base member 211 is composed of a horizontal slit 211h which is horizontally recessed toward the inside of the central portion and an arc-shaped slit 211L which communicates with the horizontal slit 211h. On the side of the horizontal slit 211h, a protrusion 211t is formed which slightly protrudes from the circular outer periphery of the base member 211 to provide elasticity which is given when the protrusion 211t is pressed to move inwardly.

The holder member 262 has a cylindrical portion 262y formed at the tip and a pair of concave portions 262s formed in the cylindrical portion 262y. The diameter of the cylindrical portion 262y is made slightly smaller than the width of the protrusions 211t of the base member 211. The protrusions 211t are elastically deformed inward when they are pressed, to engage and fix the base member 211 with the cylindrical portion 262y of the holder member 262.

Next referring to FIGS. 7 and 8, an explanation will be given of the operation of attachment/detachment of the finger unit 210 for the holder member 262. First, when attaching the finger unit 210 to the holder member 262, after the opening/closing direction of the gripping finger 13 has been roughly determined e.g. in relation to the position of the switch 57, when the protrusions 211t of the finger unit 210 are engaged with the cylindrical portion 262y of the holder member 262 while they are nipped, the finger unit 210 is attached to the holder member 262. Thus, the opening/closing direction of the gripping finger 13 is set in a nearly desired direction. In order to adjust the opening/closing direction of the gripping finger 13, with a rod-like member (not shown) being inserted into the slit 211L of the base member 211, the base member 211 is rotated by sliding so that the gripping finger 13 is moved to the desired position, thereby fixedly engaging the finger unit 210 with the holder member 262. After such engagement, the common portion 13g of the gripping finger 13 is fixed to the hole 35e of the cam follower 35 using the screw 15, thus completing the attachment of the finger unit 210.

On the other hand, when detaching the finger unit 210 from the holder member 262, as shown in FIG. 2, FIG. 8(a) and FIG. 8(b), after the common portion 13g of the gripping finger 13 has been separated from the cam follower 35 by turning the screw 15, the tip of a conical jig (not shown) is put on the lower end of the base member 211 from the concave portion 262u of the holder member 262 to forcibly open, thereby detaching the finger unit 210.

As described above, in accordance with this embodiment, the position where the finger unit 210 is attached to the holder member 262 can be rotationally shifted along the cylindrical portion 262y of the holder member 262 using the elastic protrusions 211t of the base member 211. For this reason, by turning the finger unit 210 with respect to the holder member 262 in view of the position of the switch 57, the position where the finger unit 210 is fixed can be continuously selected. Thus, the opening/closing direction of the gripping finger 13 of the finger unit 210 can be continuously selected. Therefore, when the operator grips or releases the object using the electric tweezers held by his hand 1 through the opening/closing operation thereof while operating the switch 57, the workability can be improved.

Further, where the electric tweezers 1 is fixed to e.g. a robot hand, the opening/closing direction of the gripping finger 13 can be easily selected in a manner described above.

THIRD EMBODIMENT

Figure 9:
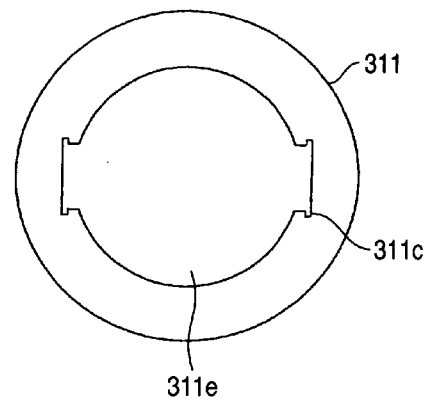
FIG. 9 is a plan view of a base member according to still another embodiment of this invention.
Figure 10:
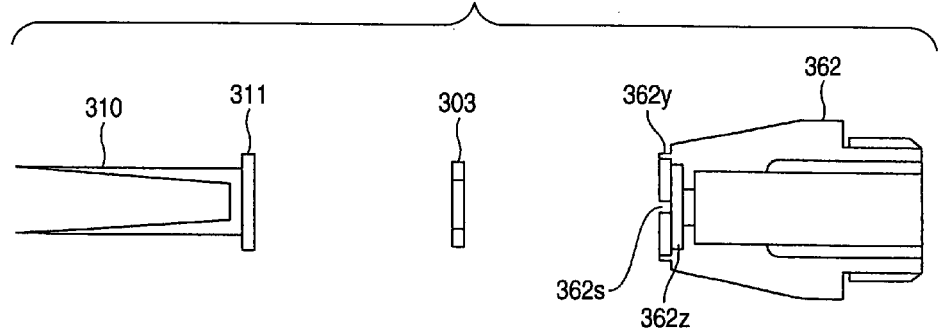
FIG. 10 is an exploded perspective view of the base member shown in FIG. 9, a magnetic member and a holder member inclusive of their partial sections.

Referring to FIGS. 9 and 10, an explanation will be given of still another embodiment of this invention. FIG. 9 is a plan view of a base member, and FIG. 10 is an exploded front view including a partial section of each of a finger unit, a magnet member and a holder member.

Like the second embodiment, this embodiment intends to select the opening/closing direction of the gripping finger 13 continuously, and also facilitate the attachment/detachment between a finger unit 310 (gripping finger 13) and a holder member 362.

In FIGS. 9 and 10, a base member 311 is made of a magnetic substance such as iron, and formed in a ring-shape having a hole in the center. The base member 311 has two recesses 311c which are to be engaged with the gripping finger 13 while the one end portions of the gripping finger 13 are nipped.

The holder member 362 has a shape similar to that in the second embodiment, i.e. includes a cylindrical portion 362y formed at the tip, a pair of concave portions 362s formed in the cylindrical portion 262, and a cylindrical concave portion 362z which is formed in a ring-shape having a hole at the center at the inner part. communicating with the cylindrical portion 362y. To the cylindrical concave portion 362z, a magnetic member 303 made of a permanent magnet is fixed by use of an adhesive.

Referring to FIGS. 2, 9 and 10, an explanation will be next given of the attachment/detachment operation of the finger unit 310 for the holder member 362. First, when attaching the finger unit 310 to the holder member 362, after the opening/closing direction of the gripping finger 13 has been roughly determined e.g. in relation to the position of the switch 57, the finger unit 310 is placed on the ring-shaped member 303 so that the base member 311 is attached to the holder member 362 through the magnetic member 303. Thus, the opening/closing direction of the gripping finger 13 is set in a nearly desired direction. In order to adjust the opening/closing direction (rotating direction) of the gripping finger 13, the gripping finger 13 is moved to a desired position while the finger unit 310 is rotated relatively to the magnetic member 303, so that the finger unit 310 is fixed to the holder 362 through the ring-shaped member 303. After such fixing, the common portion 13g of the gripping finger 13 is fixed to the hole 35e of the cam follower 35 using the screw 15.

On the other hand, when detaching the finger unit 310 from the holder member 362, as shown in FIG. 2, after the common portion 13g of the gripping finger 13 has been separated from the cam follower 35 by turning the screw 15, the tip of a conical jig (not shown) is put on the lower end of the base member 211 from the concave portion 362z of the holder member 362 to forcibly open, there by detaching the finger unit 310.

As described above, in accordance with this embodiment, the position where the finger unit 310 is attached to the holder member 362 can be rotationally shifted continuously along the holder member 362 through the magnetic member 303. For this reason, for example, in relation to the position of the switch 57, the opening/closing direction of the gripping finger 13 can be continuously selected. In addition, the attachment between the base member 311 and holder member 362 can be made easily. Therefore, when the operator grips or releases the object using the electric tweezers 1 held by his hand 1 through the opening/closing operation thereof while operating the switch 57, the workability can be improved.

Further, where the electric tweezers 1 is fixed to e.g. a robot hand, the opening/closing direction of the gripping finger 13 can be easily selected in a manner described above.

FOURTH EMBODIMENT

Referring to FIGS. 11 and 12, an explanation will be given of a further embodiment of this invention. FIG. 11 is a plan view (a) and a front sectional view (b) of a holding nut. FIG. 12 is an exploded front view for explaining the operation of mounting a finger unit in a holder member using the holding nut.

In FIGS. 11 and 12, a holder member 462 includes a cylindrical portion for screwing in which a cylindrical portion 462y formed at the tip and a 462n communicating with the cylindrical portion 462y and having an outer periphery slightly larger than that of the cylindrical portion 462y are made. The cylindrical portion 462y has an inner periphery slightly larger than the outer periphery of the base member 311, and the cylindrical portion 462y has a depth of the inner concave portion which is slightly shallower than the thickness of the base member 311. The former item intends to facilitate attachment/detachment of the base member 311, whereas the latter item intends to press and fix the base member 311 using the inside of the holding nut 413.

The holding nut 413 which acts as the member for fixing is formed in a substantially cup shape, and has a hole 413e made at the center through which the gripping finger 13 is passed and a screw 413a formed on the inner wall of the inside, which is to be screwed with a screw 462n of the holder member 462.

By screwing the holding nut 413 with the screw 462n of the holder member 462, the upper outer edge of the base member 311 inserted in the cylindrical portion 462y is pressed and secured to the holder member 462.

Next, referring to FIGS. 2, 11 and 12, an explanation will be given of the attachment/detachment operation of the finger unit 310 for the holder member 462. First, when attaching the finger unit 310 to the holder member 462, after the opening/closing direction of the gripping finger 13 has been roughly determined e.g. in relation to the position of the switch 57, the finger unit 310 is placed on the cylindrical portion 462y of the holder member 462 and the screw 413a of the holding nut 413 is screwed with the screw 462n of the holder member 462 so that the base member 311 is attached to the holder member 462. After such fixing, as shown in FIG. 2, the common portion 13g of the gripping finger 13 is fixed to the hole 35e of the cam follower 35 using the screw 15.

On the other hand, when detaching the finger unit 310 from the holder member 462, as shown in FIG. 2, after the common portion 13g of the gripping finger 13 has been separated from the cam follower 35 by turning the screw 15, by free dropping, the finger unit 310 is detached from the cylindrical portion 462y of the holder member 462.

As described above, in accordance with this embodiment, the position where the finger unit 310 is attached to the holder member 462 can be rotationally shifted continuously so that the finger unit 310 is secured to the desired position using the holding nut 413. For this reason, for example, in relation to the position of the switch 57, the opening/closing direction of the gripping finger 13 of the finger unit 310 with respect to the holder member 462 can be continuously selected. Therefore, when the operator grips or releases the object using the electric tweezers 1 held by his hand through the opening/closing operation thereof while operating the switch 57, the workability can be improved.

Further, where the electric tweezers 1 is fixed to e.g. a robot hand, the opening/closing direction of the gripping fingers 13 can be easily selected in a manner described above.

INDUSTRIAL APPLICABILITY

As understood from the description hitherto made, the electric tweezers according to this invention is suitable to grip or release an object.

The invention claimed is:

1. Electric tweezers comprising:
   a motor;
   a gripping member with a tip portion which releases and grips an object, the gripping member having one end portion and another end portion that alters an amount that the tip portion is opened and closed according to a quantity of translational displacement;
   a base member having an engagement portion which engages the one end portion of the gripping member;
   a holder member fixedly coupled the one end portion, the holder member having a penetrating hollow cylindrical portion;
   a switch for rotating and stopping the motor;
   a transformation mechanism accommodated in the holder member and coupled with a shaft of the motor, the transformation mechanism transforming a rotation of the motor into the translational displacement to move the another end portion of the gripping member; and
   an attaching section capable of detachably attaching the base member to a plurality of different positions relative to the holder member.

2. The electric tweezers according to claim 1, wherein the attaching section comprises at least one of a concave portion and a convex portion provided in the holder member and at least one of a convex portion and a concave portion provided in the base member.

3. The electric tweezers according to claim 1, wherein
   the base member has an outer edge that is substantially circular and slits that are compressed when the outer edge is pressed, and serves as the attaching section; and
   the holder member has a cylindrical portion to be fixedly engaged with the base member, and serves as the attaching section.

4. The electric tweezers according to claim 1, wherein the attaching section couples the holder member and the base member through a magnetic member made of a magnet.

5. The electric tweezers according to claim 1, wherein the attaching section comprises a screw formed on an outer periphery of the holder member and a fixing member screwed to the screw to fix the base member.

6. The electric tweezers according to claim 1, wherein said one end portion and said another end portion are distal to said tip portion.

7. The electric tweezers according to claim 1, wherein said gripping member is in the form of a first finger and a second finger, and wherein said first finger includes said one end portion and said another end portion, and said second finger includes an additional one end portion and said another end portion, such that said first finger and said second finger share the same another end portion.

* * * * *